(12) United States Patent
Guerra et al.

(10) Patent No.: US 11,615,170 B1
(45) Date of Patent: Mar. 28, 2023

(54) SYSTEMS AND METHODS FOR VERIFYING DATA ACCESS FOR AN INDIVIDUAL OF AN ENTERPRISE SYSTEM

(71) Applicant: United Services Automobile Association (USAA), San Antonio, TX (US)

(72) Inventors: Oscar Guerra, San Antonio, TX (US); Megan Sarah Jennings, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/887,500

(22) Filed: May 29, 2020

(51) Int. Cl.
*H04L 29/06* (2006.01)
*G06F 21/31* (2013.01)
*G06F 21/62* (2013.01)

(52) U.S. Cl.
CPC .............. *G06F 21/31* (2013.01); *G06F 21/62* (2013.01)

(58) Field of Classification Search
CPC ................................. G06F 21/31; G06F 21/62
See application file for complete search history.

(56) References Cited

U.S. PATENT DOCUMENTS

| | | | |
|---|---|---|---|
| 10,986,131 B1* | 4/2021 | Kruse | H04L 63/10 |
| 2010/0058446 A1* | 3/2010 | Thwaites | H04L 63/101 |
| | | | 709/224 |
| 2013/0227712 A1* | 8/2013 | Salem | G06F 21/6218 |
| | | | 726/30 |
| 2017/0346862 A1* | 11/2017 | Hanhirova | H04L 63/08 |
| 2018/0060523 A1* | 3/2018 | Farh | G16H 70/60 |
| 2021/0092124 A1* | 3/2021 | Albero | G06N 20/00 |

* cited by examiner

*Primary Examiner* — Jason K Gee
(74) *Attorney, Agent, or Firm* — Fletcher Yoder, P.C.

(57) ABSTRACT

A system includes a database configured to store a plurality of datasets and a monitoring system communicatively coupled to the database. The monitoring system is configured to perform operations that include receiving information, which has user information associated with a user and determining whether the received information is indicative of an update to a data access right associated with the user, in which the update to the data access right comprises a change in accessibility of a dataset of the plurality of datasets. The monitoring system is also configured to perform operations that include outputting a notification indicative of reviewing the user information associated with the user in response to determining the received information is indicative of an update to the data access right associated with the user.

19 Claims, 3 Drawing Sheets

SYSTEMS AND METHODS FOR VERIFYING DATA ACCESS FOR AN INDIVIDUAL OF AN ENTERPRISE SYSTEM

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

Various organizations and enterprises may store different types of data to facilitate performing their day-to-day operations. Thus, the employees and other individuals working at such organizations may be tasked with working on a portion of the data, such as various datasets included in the stored data. The organization may implement data access policies to enable or block employee access to various types of data, such as to enable the employee to work on datasets that are relevant to their working responsibilities and blocking the employee from accessing datasets that are irrelevant to their working responsibilities. For example, based on information associated with an employee, the employee may access a certain type of dataset but not other types of datasets. Indeed, the employee's access may be based on a data information sharing agreement (DISA), which may be implemented based on the personnel (e.g., a supervisor, an executive) with whom the employee works. Unfortunately, as the number of employees grow, it may be difficult to track the status or information of each employee. Therefore, it may be challenging to monitor whether each employee is able to access the intended datasets and perform their work.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
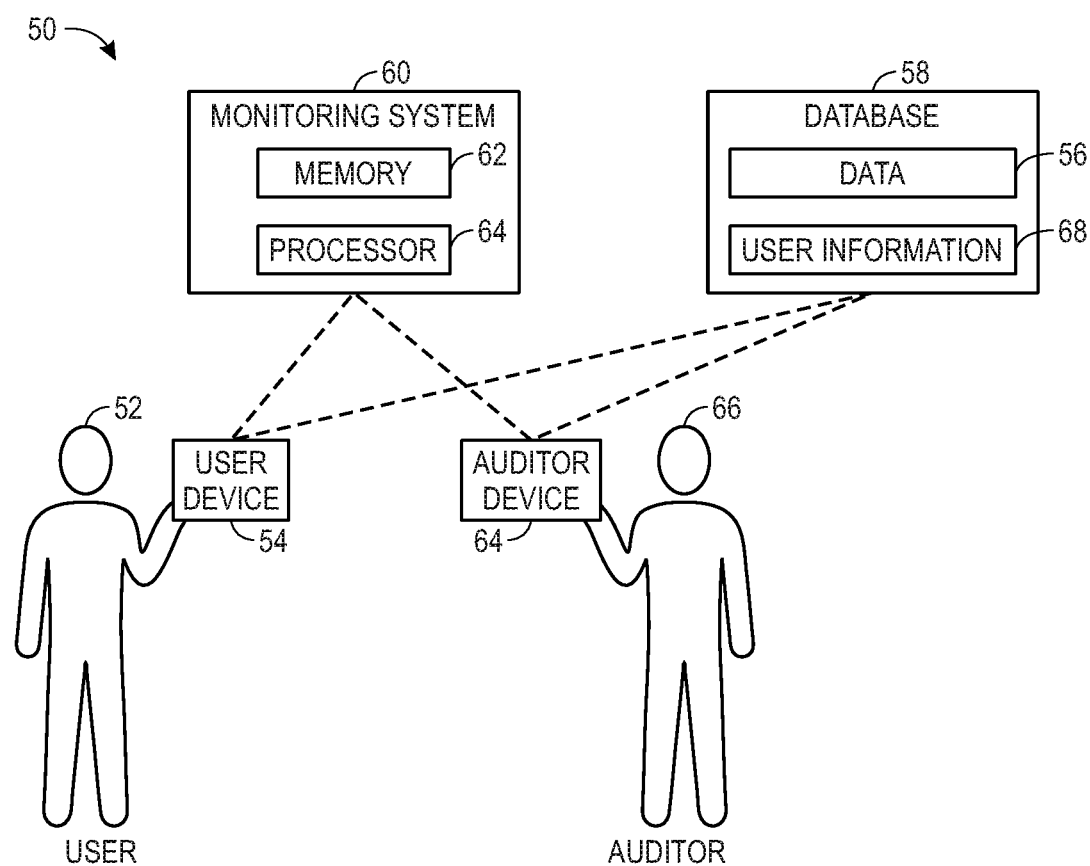
FIG. 1 is a schematic diagram of an embodiment of a system that may be used to update data access rights associated with a user, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to systems and methods to identify information or statuses of various employees within an enterprise system to determine whether each employee has access to correct datasets. For example, the enterprise system may include a database storing various data, such as product data, operating data, and the like, with which employees may work to carry out their work responsibilities. Each employee may have access to a portion of the data. For instance, an employee may be able to view, modify, or otherwise access specific datasets relevant to their work responsibilities. However, the employee may not be able to access other specific datasets that are not relevant to their work responsibilities so as to limit unnecessary exposure of data by restricting access of different datasets to relevant employees. To this end, data access rights, such as a data information sharing (DISA), may be implemented to designate the datasets that are accessible to each employee.

However, the enterprise system may include numerous employees, and it may be difficult to monitor each employee to determine whether the employees have access to the correct datasets. For instance, it may be difficult to monitor employees as they change positions, transfer departments, change responsibilities, work with different personnel, or otherwise adjust to have to work with different datasets. As a result, it may be difficult to monitor data access rights and update the datasets that are accessible to each employee.

Accordingly, the present disclosure includes systems and methods to verify whether data access rights of an employee are to be updated based on a status of the employee and/or other factors. By way of example, certain information regarding each employee is stored in the database. In some embodiments, the information may include a working status and, in response to a change of the working status, a notification may be sent (e.g., to an auditor, an evaluator, a reviewer) to verify whether the current data access rights of the employee remain accurate in light of the updated working status. In additional or alternative embodiments, the information may be associated with access of datasets and, in response to the information indicating the employee has not recently accessed a dataset (e.g., within a threshold time), the notification may be sent to verify that the current data access rights of the employee remain accurate. In this way, the information of the employee may be automatically monitored, and verifications of the data access rights may be automatically initiated to implement and update the correct data access rights. As such, the work performance of each employee and the operation of the enterprise system may be improved. Although the embodiments disclosed herein refer to changing accessibility of data for the employees, additional or alternative embodiments may change the accessibility of other content, such as applications, functionalities, information, features, and the like, based on respective statuses of the employees.

With this in mind, FIG. 1 is a schematic diagram of an embodiment of a system 50 (e.g., an enterprise system) that may be used to update data access rights associated with a user 52, such as an employee. In the illustrated embodiment, the user 52 may utilize a user device 54 to access data 56, which may be stored on a database 58 (e.g., a physical storage, a cloud-based storage). For example, the user device 54 may be a mobile device, a desktop computer, a laptop computer, a tablet, or any other suitable device that is communicatively coupled to the database 58 to enable the user 52 to access the data 56. The system 50 may include a monitoring system 60 (e.g., a physical computing system, a cloud-computing system) that may be communicatively coupled to the user device 54. The monitoring system 60 may be configured to determine whether data access rights (e.g., initiated via a DISA) associated with the user 52 are correctly implemented (e.g., whether the DISA correctly applies to the user 52). To this end, the monitoring system 60 may include a memory 62 and a processor or processing circuitry 64. The memory 62 may include volatile memory, such as random-access memory (RAM), and/or non-volatile memory, such as read-only memory (ROM), optical drives, hard disc drives, solid-state drives, or any other non-transitory computer-readable medium that includes instructions executable by the processor 64. The processor 64 may include one or more application specific integrated circuits (ASICs), one or more field programmable gate arrays (FPGAs), one or more general purpose processors, or any combination thereof, configured to execute the instructions stored in the memory 62, such as to enable the user device 54 to access certain datasets of the data 56 but not other datasets of the data 56. As an example, the user device 54 may include a user interface (e.g., a display), and the monitoring system 60 may enable accessible data to be presented on the user interface, but may block inaccessible data from being presented on the user interface. As such, the monitoring system 60 enables the user 52 to access the accessible data, but not the inaccessible data, via the user device 54.

In some embodiments, the data access rights associated with the user 52 may be controlled by an auditor 66 of the system 50. The auditor 66, for example, may review information regarding the user 52 in order to determine the data 56 that is accessible to the user 52 (e.g., based on the DISA in place). Such information may include user information 68 (e.g., credentials) stored in the database 58. By way of example, the user information 68 may be indicative of a current employment position of the user 52, of other users that may work with or otherwise be associated with the user 52, an experience level or specialty of the user 52, a department or division associated with the user 52, a work responsibility of the user 52, other suitable user information 68, or any combination thereof. In some embodiments, the auditor 66 may review the user information 68 and may indicate or select the data access rights to be implemented based on the user information 68. For instance, the auditor 66 may utilize an auditor device 64 to select and implement the data access rights, such as by initiating a DISA accordingly. It should be noted that although the illustrated system 50 includes a single auditor 66, the system 50 may include any number of auditors 66, such as one or more auditors 66 for each different parts (e.g., datasets) of the data 56. As such, the system 50 may assign one or more auditors 66 to the user 52 and, upon identification that the data access rights of the user 52 is to be audited, the system 50 may notify at least one of the assigned auditors 66 to determine whether the user 52 may access a particular dataset of the data 56.

However, as mentioned above, it may be difficult for the auditor 66 to monitor the user information 68 of each user within the system 50. That is, there may be an excessive amount of user information 68 stored in the database 58, and the auditor 66 may not be able to determine whether the correct data access rights are implemented for each user based on the user information 68. For this reason, the monitoring system 60 may automatically monitor the user information 68 and may verify with the auditor 66 whether the correct data access rights are implemented based on the updated user information 68. By way of example, the monitoring system 60 may determine whether a change of the user information 68 is indicative that the current access data rights no longer apply to the user and, therefore, the access data rights are to be updated. As a result, the monitoring system 60 may prompt the auditor 66 to verify that the current data access rights still apply. To this end, the monitoring system 60 may be communicatively coupled to the auditor device 64, and the monitoring system 60 may enable the auditor 66 to verify the data access rights via the auditor device 64. By way of example, the monitoring system 60 may cause the auditor device 64 to present a display (e.g., a graphical user interface [GUI]) with which the auditor 66 may interact for verifying whether the current data access rights still apply or whether updated data access rights are to be implemented.

In certain embodiments, the monitoring system 60 may use machine learning (e.g., supervised machine learning, unsupervised machine learning) to determine whether a change in the user information 68 is indicative that the current data access rights are to be updated. As used herein, machine learning refers to algorithms and statistical models that the monitoring system 60 may use to perform a specific task without using explicit instructions, relying instead on patterns and inference. In particular, machine learning generates a mathematical model based on data (e.g., sample or training data, historical data) in order to make predictions or decisions without being explicitly programmed to perform the task. Thus, as subsequent changes to the user information 68 occur, the patterns indicative of having to change the data access rights may be updated and better reflect when data access rights are to be updated. The monitoring system 60 may therefore refer to the patterns and other information stored in the database 58 to identify having to update data access rights more accurately. For example, the monitoring system 60 may prompt the auditor 66 more selectively to verify that the data access rights are to be updated (e.g., with fewer false positives in which the auditor 66 verifies the current data access does not have to be updated).

In some embodiments, such as when particular known examples exist that correlate to future predictions that the monitoring system 60 will be tasked with generating, supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Supervised learning algorithms include classification and regression. Classification algorithms are used when the outputs are restricted to a limited set of values, and regression algorithms are used when the outputs may have any numerical value within a range. Further, similarity learning is an area of supervised machine learning closely related to regression and classification, but the goal is to learn from examples using a similarity function that determines the extent in which two objects are similar or related.

Additionally and/or alternatively, in some situations, it may be beneficial for the monitoring system 60 to utilize unsupervised learning (e.g., when particular output types are not known). Unsupervised learning algorithms take a set of data that contains only inputs, and find structure in the data, such as grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data.

In any case, the monitoring system 60 may use machine learning to identify when a change or update in the user information 68 may likely indicate that the data access rights for the user 52 are to be updated to prompt the auditor 66 to verify accordingly. That is, the monitoring system 60 may identify and dynamically update patterns associated with the user information 68 indicative of a likely need to update the data access rights. As such, for subsequent changes of the user information 68, the monitoring system 60 may more accurately identify whether such changes should prompt verification of data access rights with the auditor 66.

In addition to or as an alternative to the user information 68 stored within the database 58, the monitoring system 60 may use other information or data to determine whether the current data access rights of the user 52 are to be verified. As an example, the monitoring system 60 may monitor the interactions between the user 52 and the user device 54, such as a frequency or time in which the user 52 accesses certain datasets via interaction with the user device 54. As another example, the monitoring system 60 may monitor changes regarding the data 56 (e.g., re-categorization and/or re-organization of the data 56). Indeed, the monitoring system 60 may monitor any suitable information to determine whether to prompt the auditor 66 and verify the current data access rights of the user 52 accordingly.

Figure 2:
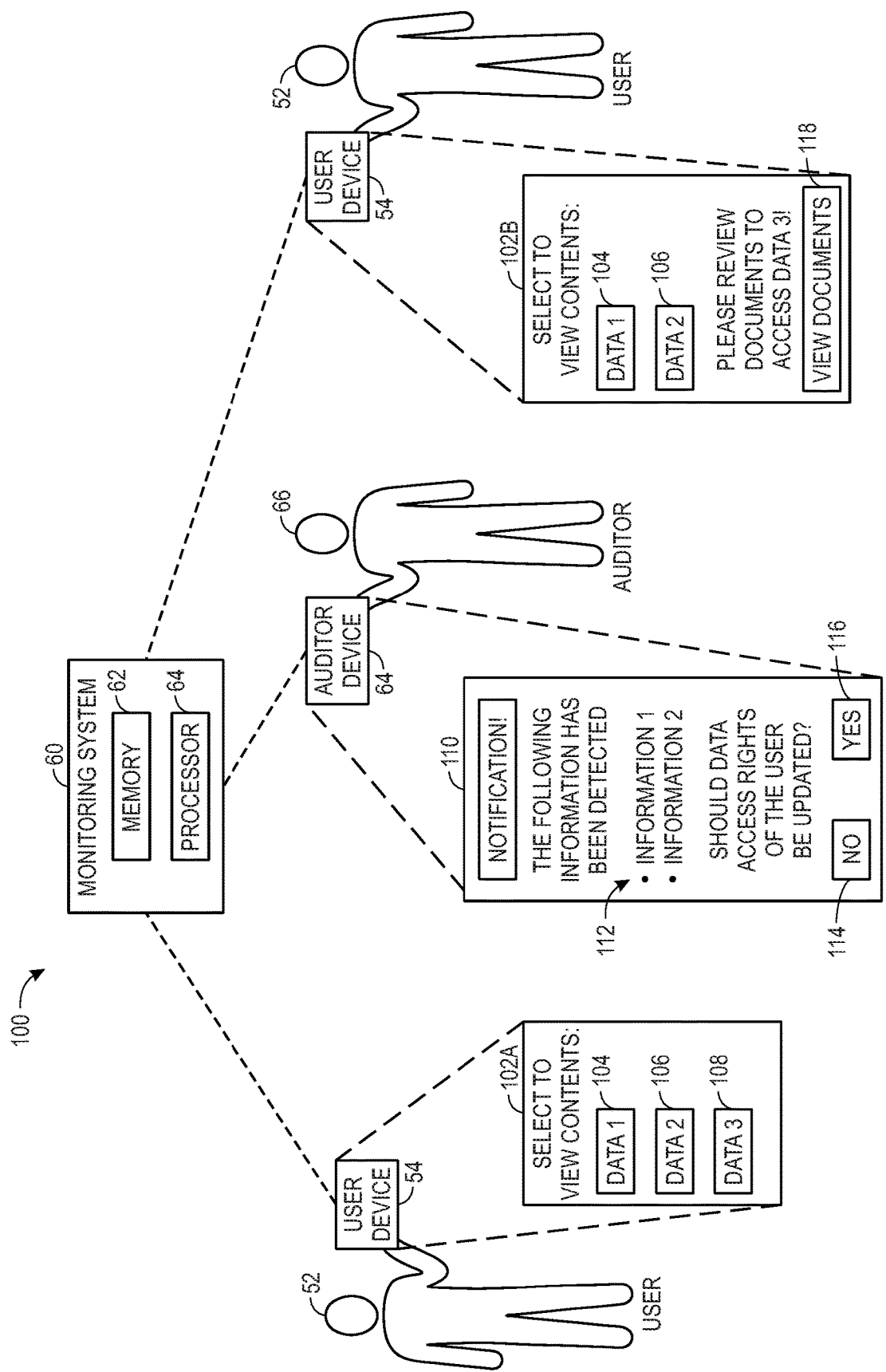
FIG. 2 is a schematic diagram of an embodiment of a system illustrating interactions between a user, an auditor, and a monitoring system, in accordance with an embodiment of the present disclosure.

FIG. 2 is a schematic diagram of an embodiment of a system 100 illustrating interactions between the user 52, the auditor 66, and the monitoring system 60. Initially, the user device 54 may present a first display 102A (e.g., a first GUI) that the user 52 may use to select and view various data, such as a first dataset 104, a second dataset 106, and/or a third dataset 108. That is, the currently implemented data access rights (e.g., based on an initial DISA) may enable the user 52 to have full access (e.g., full viewing privileges and/or editing privileges) to each of the datasets 104, 106, 108, such as to access, view, and/or modify the contents included within any of the datasets 104, 106, 108.

The monitoring system 60 may also monitor various information in order to determine whether the data access rights of the user 52 are to be updated. That is, such changes may cause the monitoring system 60 to prompt the auditor 66 to verify that the user 52 may access each of the datasets 104, 106, 108. As an example, the monitoring system 60 may determine that a change in the user information 68 stored in the database 58, that an interaction between the user 52 and the user device 54, and/or a change in the data 56 stored in the database 58 (e.g., a change regarding any of the datasets 104, 106, 108) may be indicative of having to update the data access rights of the user 52. In response to identification of such information, the monitoring system 60 may cause the auditor device 64 to present a second display 110 (e.g., a second GUI) to the auditor 66. The second display 110 may notify the auditor 66 that the monitoring system 60 has identified certain information and may prompt the auditor 66 to indicate whether the current data access rights should be updated based on the identified information. For instance, the second display 110 may include an information section 112 listing various information detected by the monitoring system 60, in which each of the information may be relevant to whether the data access rights are to be updated. By way of example, each listed information may indicate how the user information 68 has changed, how the user 52 has interacted with the user device 54, how the data 56 has changed, and the like. As a result, the auditor 66 may view the information section 112 and better determine whether the data access rights of the user 52 are to be updated.

The second display 110 may further include a No icon 114 and a Yes icon 116 that are each selectable by the auditor 66. For example, the auditor 66 may select the No icon 114 to transmit a user input indicating that the data access rights of the user 52 are not to be updated. As a result, no further actions may be performed by the monitoring system 60 or by the auditor 66. Accordingly, the same data access rights of the user 52 may remain in effect, and the user 52 may continue to have access to the datasets 104, 106, 108. However, the auditor 66 may select the Yes icon 116 to transmit a user input indicating that the data access rights of the user 52 are to be updated. In some embodiments, the monitoring system 60 may then prompt the auditor 66 (e.g., with a third display) to submit updated data access rights to be implemented for the user 52. Accordingly, the auditor 66 may review information (e.g., credentials associated with the user 52) in order to determine the updated data access rights to be implemented. Additionally or alternatively, the monitoring system 60 may automatically determine the updated data access rights to be implemented for the user 52. As an example, the monitoring system 60 may further analyze the information to determine how the data access rights may be updated or changed, such as by determining which of the datasets 104, 106, 108 may no longer be accessible to the user 52 and/or by determining if another dataset is to be accessible to the user 52. Based on determining how the data access rights may be updated, the monitoring system 60 may then suggest certain updates to the auditor 66 and/or may directly initiate a procedure to update the data access rights.

In any case, upon identification of the updated data access rights, the monitoring system 60 may enable the user device 54 to present an updated first display 102B (e.g., an updated first GUI), and the user 52 may have access to different datasets in the updated first display 102B. In the illustrated embodiment, the updated first display 102B may enable the user 52 to access the first dataset 104 and/or the second dataset 106, but not the third dataset 108. That is, the user 52 is blocked from accessing the third dataset 108. However, in additional or alternative embodiments, the user 52 may be blocked from accessing any combination of the datasets 104, 106, 108 and/or enabled to access another dataset via the updated first display 102B based on the newly implemented updated data access rights (e.g., via a DISA).

In certain embodiments, in order to regain access to the third dataset 108 and/or to gain access to any other desirable dataset, the user 52 may be prompted to complete a certain task. For instance, the illustrated updated first display 102B includes a view documents icon 118 to enable the user 52 to view and/or complete (e.g., sign or execute) certain documents to regain access to the third dataset 108. By way of example, the documents may be associated with an updated DISA that, upon execution (e.g., by the user 52, by other employees working with the user 52), may then cause the data access rights of the user to update, thereby enabling the user to access the third dataset 108. Accordingly, the user 52 may not be able to access the third dataset 108 or other corresponding datasets without selecting the view documents icon 118 and completing the associated task.

Each of FIGS. 3 and 4 below illustrates a respective method for prompting review of the data access rights for a user (e.g., the user 52). Each of the methods may be performed by a control system, such as the monitoring system 60. It should be noted that the steps of each method may be performed differently than depicted in FIGS. 3 and 4. For example, additional steps may be performed, and/or certain illustrated steps may be removed, modified, and/or performed in a different order.

Figure 3:
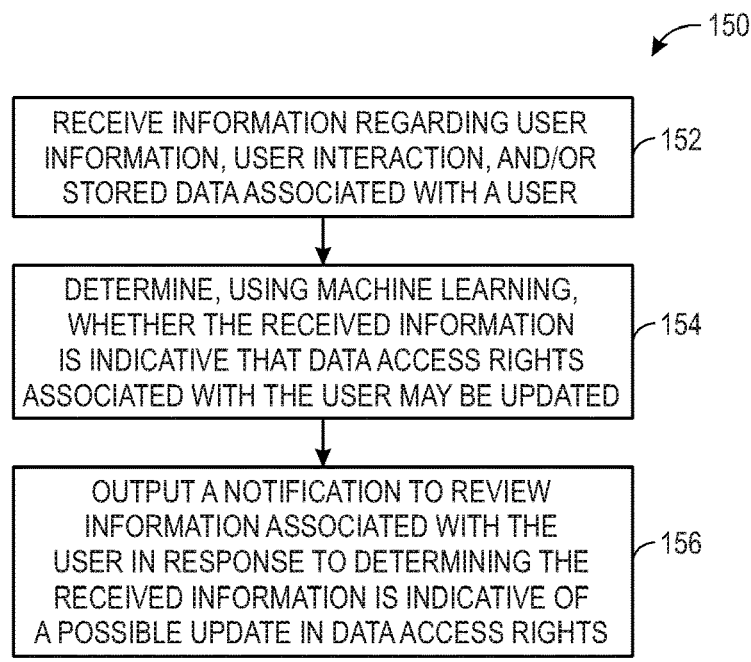
FIG. 3 is a flowchart of an embodiment of a method for outputting a notification for updating data access rights based on receiving certain information regarding the user, in accordance with an embodiment of the present disclosure.

FIG. 3 is a flowchart of an embodiment of a method 150 for outputting a notification (e.g., to the auditor 66) regarding data access rights based on receiving certain information regarding the user 52. For instance, the method 150 may be performed while current data access rights are implemented (e.g., based on a recently executed or completed DISA) to enable the user 52 to access current datasets. At block 152, information is received. The information may include user information 68, such as various employment or working information associated with the user 52. The information may additionally or alternatively include interaction and/or access activity information between the user 52 and the user device 54. For instance, such user interaction may include how frequently the user 52 accesses one of the currently accessible datasets and/or when one of the currently accessible datasets has been previously accessed by the user 52. The information may further include information regarding the data 56 stored in the database 58. As an example, such information may include how different datasets are categorized and/or organized and may control which datasets are accessible by the user 52 based on the data access rights (e.g., whether each dataset is included in the DISA).

At block 154, the received information is analyzed to determine whether the received information is indicative that the data access rights associated with the user 52 may have to be updated. In other words, based on the received information, the datasets that are accessible by the user 52 may have to be adjusted. As an example, certain changes associated with the user information 68 may indicate the data access rights for the user 52 are to be updated. That is, each dataset may be accessible to users associated with a certain user information 68. For instance, each dataset may be accessible to users employed in one of a set of employment positions or departments, users working with (e.g., supervised by) one of a set of other users, users having one of a set of experience levels or work responsibilities, and the like. Thus, if the received information indicates that the user 52 is no longer associated with a user information 68 indicative of accessibility to a first dataset, the received information may indicate that the first dataset should no longer be accessible to the user 52. Similarly, if the received information indicates that the user 52 is newly associated with user information 68 indicative of a second dataset, the received information may indicate that the second dataset should now be accessible to the user 52.

Additionally or alternatively, a certain user interaction or access activity may indicate the data access rights for the user 52 are to be updated. In an example, the user interaction may include a frequency of accessing a dataset (e.g., a quantity within a period of time) below a threshold frequency. In another example, the user interaction may indicate that the user 52 has not accessed a dataset within a threshold period of time (e.g., within 50 days, within 100 days, within 1 year). Indeed, such user interaction may indicate that the dataset is not being used by the user 52 in their work responsibility and therefore may be changed to be inaccessible.

Further still, a change in the data 56 may indicate the data access rights for the user 52 are to be updated. By way of example, data 56 associated with a certain type, category, group, class, another suitable classification or characterization, or any combination thereof, may be accessible to the user 52. However, if the classification of the data 56 changes, the datasets that are accessible to the user 52 may be changed accordingly. For instance, a first dataset may no longer be of a classification that is accessible to the user 52 (e.g., the first dataset should no longer be accessible to the user 52) and/or a second dataset may be changed to a classification that is accessible to the user 52 (e.g., the second dataset should now be accessible to the user 52). In any case, the change in the classification of the data 56 may indicate the accessibility of certain datasets are to be changed.

As described above, in some embodiments, machine learning may be used to determine that the data access rights for the user 52 are to be updated. That is, patterns of received information indicative of a possible update of data access rights may be dynamically updated based on historically received information (e.g., previously received user information 68 associated with a previous update of data access rights) and/or training data (e.g., baseline received user information 68 associated with an update of data access rights) and more accurately reflect that data access rights are to be updated. In this manner, subsequently received information may be used to determine a possible update of data access rights more accurately. Accordingly, there may be an increased chance that an identification of a possible update of data access rights accurately indicates that the data access rights are to be updated.

At block 156, a notification may be output to indicate that information (e.g., the user information 68) associated with the user 52 is to be reviewed to determine whether the data access rights of the user 52 should be updated. In certain embodiments, the notification may be output to the auditor device 64 of the auditor 66 so as to inform the auditor 66 to review the information. For this reason, the notification may be presented in a manner (e.g., may include the user information 68 received with respect to block 152) to guide the auditor 66 with reviewing the user information 68. That is, the notification may include reasons regarding how the possible update of data access rights was identified to facilitate the auditor 66 with verification of whether the data access rights are to be updated.

Figure 4:
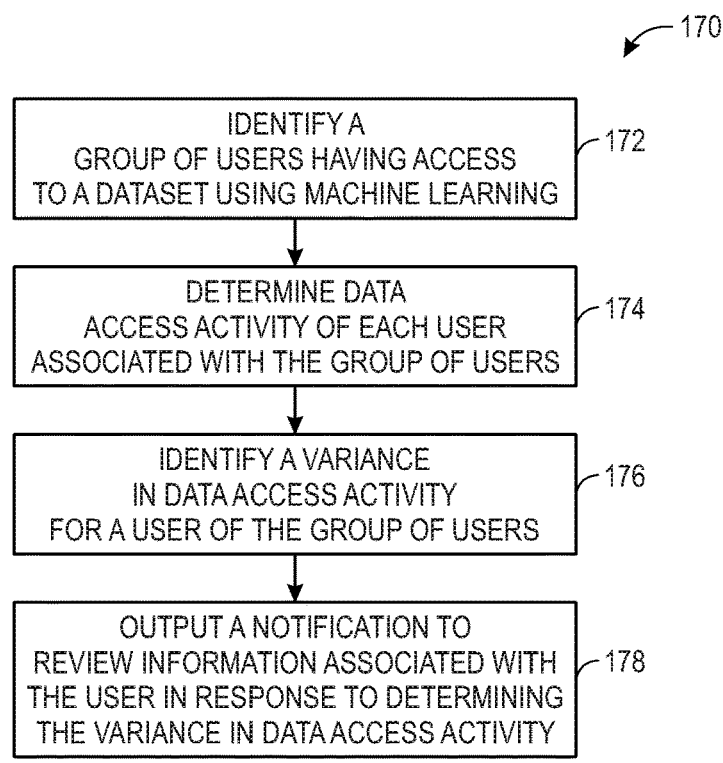
FIG. 4 is an embodiment of a flowchart of a method for outputting a notification regarding data access rights based on receiving certain information regarding multiple users, in accordance with an embodiment of the present disclosure.

FIG. 4 is an embodiment of a flowchart of a method 170 for outputting a notification (e.g., to the auditor 66) regarding data access rights based on receiving certain information regarding multiple users. At block 172, a group of users having access to a dataset may be identified, such as using machine learning. By way of example, the interaction between various users and their respective user devices may be monitored in order to identify that certain users have access to the dataset, such as based on a frequency of accessing the dataset, a most recent time associated with accessing the dataset, and the like. Furthermore, a portion of the users may be determined to have a shared or common characteristic, such as an employment position of the user, a work group (e.g., a supervisor or colleague), an experience level, a department, a work responsibility, or the like. In other words, a determination may be made that users associated with or having a certain characteristic may have access to the dataset.

Based on the identified group, additional relevant users may be identified. That is, users not previously identified based on the interactions monitored with respect the step at block 172 may be subsequently identified based on their respective associations with the identified group, such as based on analysis of the characteristic of the users in the identified group. At block 174, data access activity for each of the users in the identified group may be determined. For instance, a frequency of access, a previous time of access, and the like, may be identified for each of the users.

At block 176, a variance in the data access activity for a user of the group (e.g., between the data access activity for the user relative to the data access activities for other users of the group) may be identified and associated with having to update data access rights for the user, such as by using machine learning. By way of example, the user's frequency of access of the dataset may be below a threshold frequency (e.g., a threshold frequency based on the respective frequencies of access associated with other users of the group) and/or the user's previous time of accessing the dataset may be earlier than a threshold time (e.g., a threshold time based on the respective previous times of access associated with the other users of the group). For instance, the threshold frequency may be based on an average (e.g., mathematical mean, mathematical median, mathematical mode) of the respective frequencies of access associated with the other users and/or a percentile of the respective frequencies of access associated with the other users (e.g., a certain percentile of users access the dataset more frequently than the threshold frequency). Similarly, the threshold time may be based on an average of the respective previous times of access associated with the other users and/or a percentile of the respective previous times of access associated with the other users. In any case, the variance in data access activity may indicate that the user is not accessing the dataset to perform their work responsibilities with the other users of the identified group. Accordingly, such data access activity for the user may indicate that the user may not need access to the dataset.

In response to determining the variance in the data access activity for the user, a notification may be output (e.g., to the auditor 66) to review information associated with the user, as indicated at block 178. Using the notification, the auditor 66 may then verify whether the dataset should still be accessible to the user. For instance, in response to receiving verification that the dataset should remain accessible to the user, no further actions may be performed, and the current data access rights may still apply to the user. However, in response to receiving an indication that the dataset should no longer be accessible to the user, the user may be blocked from accessing the dataset. For example, the data access rights of the user may be updated such that the user may no longer access the dataset (e.g., the dataset may be hidden from display on the user device associated with the user).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
   a database configured to store a plurality of datasets; and
   a monitoring system communicatively coupled to the database, wherein the monitoring system comprises processing circuitry configured to perform operations comprising:
      automatically monitoring information comprising first user information associated with a first user;
      determining a change in the first user information during automatic monitoring of the information;
      determining the change in the first user information is indicative of an update to a first data access right associated with the first user, wherein the update to the first data access right comprises a change in accessibility of a dataset of the plurality of datasets;
      identifying a second user supervised by the first user;
      outputting a notification indicative of reviewing second user information associated with the second user in response to determining the change in the first user information is indicative of the update to the first data access right associated with the first user and based on the second user being supervised by the first user;
      adjusting a second data access right associated with the second user in response to receiving a first user input via the notification, wherein the first user input comprises a first indication that the second data access right is to be adjusted based on the change in the first user information; and
      blocking adjustment of the second data access right in response to receiving a second user input via the notification, wherein the second user input comprises a second indication that the second data access right is to be maintained based on the change in the first user information.

2. The system of claim 1, wherein the processing circuitry is configured to perform operations comprising identifying a plurality of users comprising the first user based on respective data access activities of the dataset of the plurality of datasets, and determining the change in the first user information is indicative of the update to the first data access right based on the change in the first user information comprising a variance between the data access activity for the first user relative to the respective data access activities for other users of the plurality of users.

3. The system of claim 2, wherein the variance comprises a frequency of access of the dataset below a threshold frequency, a previous time of access of the dataset earlier than a threshold time, or both.

4. The system of claim 3, wherein the threshold frequency is based on respective frequencies of access associated with the other users of the plurality of users, the threshold time is based on respective previous times of access of the dataset associated with the other users of the plurality of users, or both.

5. The system of claim 1, wherein the first user information comprises an employment position of an third user associated with the first user.

6. The system of claim 1, wherein the processing circuitry is configured to perform operations comprising outputting the notification to a device of a third user, and the notification comprises a display prompting verification that the first data access right associated with the first user is to be updated.

7. The system of claim 6, wherein the first user input is indicative that the dataset is no longer accessible to the second user, and the processing circuitry is configured to adjust the second data access right to block user access to the dataset in response to receiving the first user input.

8. The system of claim 6, wherein the first user input is indicative that the dataset is to be accessible to the second user, and the processing circuitry is configured to adjust the second data access right to enable user access to the dataset in response to receiving the first user input.

9. The system of claim 1, wherein the information comprises a user access activity associated with the first user.

10. A tangible, non-transitory computer readable medium comprising instructions that, when executed by processing circuitry, are configured to cause the processing circuitry to perform operations comprising:
monitoring information comprising user information associated with a first user;
determining whether the monitored information is indicative of an update to a data access right associated with the first user based on the user information, wherein the update to the data access right comprises a change in accessibility of a dataset of a plurality of datasets;
identifying a second user supervised by the first user;
outputting a notification prompting verification of a change in accessibility of the dataset for the second user in response to determining the monitored information is indicative of the update to the data access right associated with the first user and based on the second user being supervised by the first user;
receiving a user input via the notification prompting verification of the change in accessibility of the dataset for the second user; and
updating user access to the dataset by the second user based on the user input received via the notification.

11. The tangible, non-transitory computer readable medium of claim 10, wherein the monitored information comprises user access activity associated with the first user, and the instructions, when executed by the processing circuitry, are configured to cause the processing circuitry to perform operations comprising determining whether the monitored information is indicative of the update to the data access right associated with the first user based on the user information, the user access activity, or both.

12. The tangible, non-transitory computer readable medium of claim 11, wherein the user access activity comprises a frequency of accessing data, a time of access of the dataset, or both.

13. The tangible, non-transitory computer readable medium of claim 10, wherein the instructions, when executed by the processing circuitry, are configured to cause the processing circuitry to perform operations comprising identifying a plurality of users comprising the first user based on respective data access activities of the dataset of the plurality of datasets, and determining whether the monitored information is indicative of a variance in the data access activity associated with the first user relative to the respective data access activities associated with other users of the plurality of users.

14. The tangible, non-transitory computer readable medium of claim 10, wherein the instructions, when executed by the processing circuitry, are configured to cause the processing circuitry to perform operations comprising using machine learning to determine whether the monitored information is indicative of update to the data access right associated with the first user.

15. A system comprising:
a database configured to store a plurality of datasets; and
a monitoring system communicatively coupled to the database, wherein the monitoring system comprises processing circuitry configured to perform operations comprising:
implementing a data access right for a first user, wherein the data access right comprises an accessibility associated with the plurality of datasets;
monitoring information, wherein the monitored information comprises user information associated with the first user;
determining the monitored information indicates the first user is no longer supervised by a second user;
outputting a notification indicative of reviewing the user information associated with the first user in response to determining the monitored information indicates the first user is no longer supervised by the second user;
adjusting the data access right in response to receiving a first user input via the notification, wherein the first user input comprises a first indication that the data access right is to be adjusted based on the monitored information; and
blocking adjustment of the data access right in response to receiving a second user input via the notification, wherein the second user input comprises a second indication that the data access right is to be maintained based on the monitored information.

16. The system of claim 15, wherein the processing circuitry is configured to perform operations comprising outputting the notification indicative of reviewing the user information associated with the first user based on an additional data access right associated with the second user in response to determining the monitored information indicates the first user is no longer supervised by the second user.

17. The system of claim 15, wherein the processing circuitry is configured to perform operations comprising adjusting the data access right by blocking access to one of the plurality of datasets, enabling access to one of the plurality of datasets, or both.

18. The system of claim 15, wherein the processing circuitry is configured to perform operations comprising implementing the data access right for the first user based on a data information sharing agreement (DISA).

19. The system of claim 18, wherein the processing circuitry is configured to perform operations comprising receiving an updated DISA and updating the data access right for the first user based on the updated DISA.

\* \* \* \* \*